United States Patent
Yi et al.

(10) Patent No.: US 11,632,798 B2
(45) Date of Patent: *Apr. 18, 2023

(54) METHOD FOR TRANSMITTING UPLINK DATA IN A WIRELESS COMMUNICATION SYSTEM AND DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 45 days.

This patent is subject to a terminal disclaimer.

(21) Appl. No.: 17/089,662

(22) Filed: Nov. 4, 2020

(65) Prior Publication Data
US 2021/0051724 A1  Feb. 18, 2021

Related U.S. Application Data

(63) Continuation of application No. 16/086,583, filed as application No. PCT/KR2017/003106 on Mar. 23, 2017, now Pat. No. 10,863,541.
(Continued)

(51) Int. Cl.
*H04W 74/08* (2009.01)
*H04W 74/00* (2009.01)
(Continued)

(52) U.S. Cl.
CPC ....... *H04W 74/0816* (2013.01); *H04W 28/02* (2013.01); *H04W 28/0268* (2013.01);
(Continued)

(58) Field of Classification Search
CPC ............. H04W 28/02; H04W 28/0268; H04W 28/0278; H04W 72/0446; H04W 72/14;
(Continued)

(56) References Cited

U.S. PATENT DOCUMENTS 9,723,618 B2 * 8/2017 Loehr ............... H04W 72/1289
9,930,569 B2 * 3/2018 Catovic ................. H04W 28/06
(Continued)

FOREIGN PATENT DOCUMENTS

CN         102083224          6/2013
EP         2315484 A2 *  4/2011   ........ H04W 72/0413
(Continued)

OTHER PUBLICATIONS

PCT International Application No. PCT/KR2017/003106, Written Opinion of the International Searching Authority dated Jun. 26, 2017, 10 pages.
(Continued)

*Primary Examiner* — Shah M Rahman
(74) *Attorney, Agent, or Firm* — Lee Hong Degerman Kang & Waimey

(57) ABSTRACT

The present invention relates to a wireless communication system. More specifically, the present invention relates to a method and a device for transmitting uplink data in a wireless communication system. According to an aspect of the present invention, the method comprising: receiving information including contention based channel configuration and traffic characteristic associated with the contention based channel configuration; configuring a contention based channel resource according to the contention based channel configuration; checking whether uplink (UL) data is suitable for the traffic characteristic associated with the contention based channel configuration; and transmitting the UL data using the contention based channel resource if the UL data is suitable for the traffic characteristic associated with the contention based channel configuration.

8 Claims, 10 Drawing Sheets

Related U.S. Application Data

(60) Provisional application No. 62/312,440, filed on Mar. 23, 2016.

(51) Int. Cl.

| | | |
|---|---|---|
| *H04W 28/02* | (2009.01) | |
| *H04W 76/11* | (2018.01) | |
| *H04W 76/27* | (2018.01) | |
| *H04W 72/0446* | (2023.01) | |
| *H04W 72/14* | (2009.01) | |
| *H04W 80/02* | (2009.01) | |

(52) U.S. Cl.
CPC ....... *H04W 72/0446* (2013.01); *H04W 72/14* (2013.01); *H04W 74/006* (2013.01); *H04W 76/11* (2018.02); *H04W 76/27* (2018.02); *H04W 28/0278* (2013.01); *H04W 74/08* (2013.01); *H04W 80/02* (2013.01); *Y02D 30/70* (2020.08)

(58) Field of Classification Search
CPC ............... H04W 74/006; H04W 74/08; H04W 74/0816; H04W 76/11; H04W 76/27; H04W 80/02; Y02D 30/70
See application file for complete search history.

(56) References Cited

U.S. PATENT DOCUMENTS

| | | |
|---|---|---|
| 2011/0243080 A1 | 10/2011 | Chen et al. |
| 2012/0014269 A1 | 1/2012 | Ray et al. |
| 2012/0044877 A1 | 2/2012 | Ratasuk et al. |
| 2012/0044878 A1 | 2/2012 | Ratasuk et al. |
| 2012/0147830 A1* | 6/2012 | Lohr ..................... H04L 1/1854 370/329 |
| 2012/0182977 A1 | 7/2012 | Hooli et al. |
| 2012/0236816 A1 | 9/2012 | Park et al. |
| 2012/0294270 A1 | 11/2012 | Yamada et al. |
| 2013/0034071 A1 | 2/2013 | Lee et al. |
| 2013/0088983 A1 | 4/2013 | Pragada et al. |
| 2013/0163534 A1 | 6/2013 | Anderson et al. |
| 2013/0235773 A1 | 9/2013 | Wang et al. |
| 2013/0294307 A1 | 11/2013 | Johansson et al. |
| 2014/0321391 A1 | 10/2014 | Zhang et al. |
| 2014/0328183 A1 | 11/2014 | Au et al. |
| 2015/0009985 A1 | 1/2015 | Kwon et al. |
| 2015/0180676 A1 | 6/2015 | Bao et al. |
| 2016/0234124 A1 | 8/2016 | Tomici et al. |
| 2016/0285775 A1* | 9/2016 | Damnjanovic ... H04W 72/0453 |
| 2016/0309379 A1 | 10/2016 | Pelletier et al. |
| 2016/0337869 A1 | 11/2016 | Dai et al. |
| 2017/0013498 A1* | 1/2017 | Yi ........................ H04W 28/08 |
| 2017/0111927 A1* | 4/2017 | Kim .................. H04W 72/1284 |
| 2017/0367058 A1 | 12/2017 | Pelletier et al. |
| 2018/0070383 A1* | 3/2018 | Fujishiro ............. H04W 74/004 |
| 2018/0176926 A1* | 6/2018 | Xu ..................... H04W 72/0486 |
| 2018/0198592 A1* | 7/2018 | Gauvreau ........... H04W 72/048 |
| 2018/0255574 A1 | 9/2018 | Kim et al. |
| 2018/0310309 A1 | 10/2018 | Koskela et al. |
| 2018/0317246 A1 | 11/2018 | Mukherjee et al. |
| 2018/0376512 A1 | 12/2018 | You et al. |
| 2019/0045507 A1* | 2/2019 | Sorrentino .......... H04W 72/042 |
| 2019/0090277 A1 | 3/2019 | Yi et al. |

FOREIGN PATENT DOCUMENTS

| | | | |
|---|---|---|---|
| WO | 2011019813 | 2/2011 | |
| WO | 2011038780 | 4/2011 | |
| WO | 2011085403 | 7/2011 | |
| WO | 2011808403 | 7/2011 | |
| WO | 2012024067 | 2/2012 | |
| WO | WO-2014010863 A1 * | 1/2014 | ............ H04W 28/18 |
| WO | WO-2014157836 A1 * | 10/2014 | ............ H04W 4/005 |

OTHER PUBLICATIONS

U.S. Appl. No. 16/086,583, Office Action dated Dec. 9, 2019, 27 pages.
U.S. Appl. No. 16/086,583, Final Office Action dated Apr. 28, 2020, 21 pages.
3GPP, "3GPP TS 23.203 3rd Generation Partnership Project; Technical Specification Group Services and System and System Aspects; Policy and charging control architecture", Dec. 2015, V13.6.0, pp. 242 (Year: 2015).
European Patent Office Application Serial No. 17770628.0, Search Report dated Jul. 30, 2019, 9 pages.

* cited by examiner

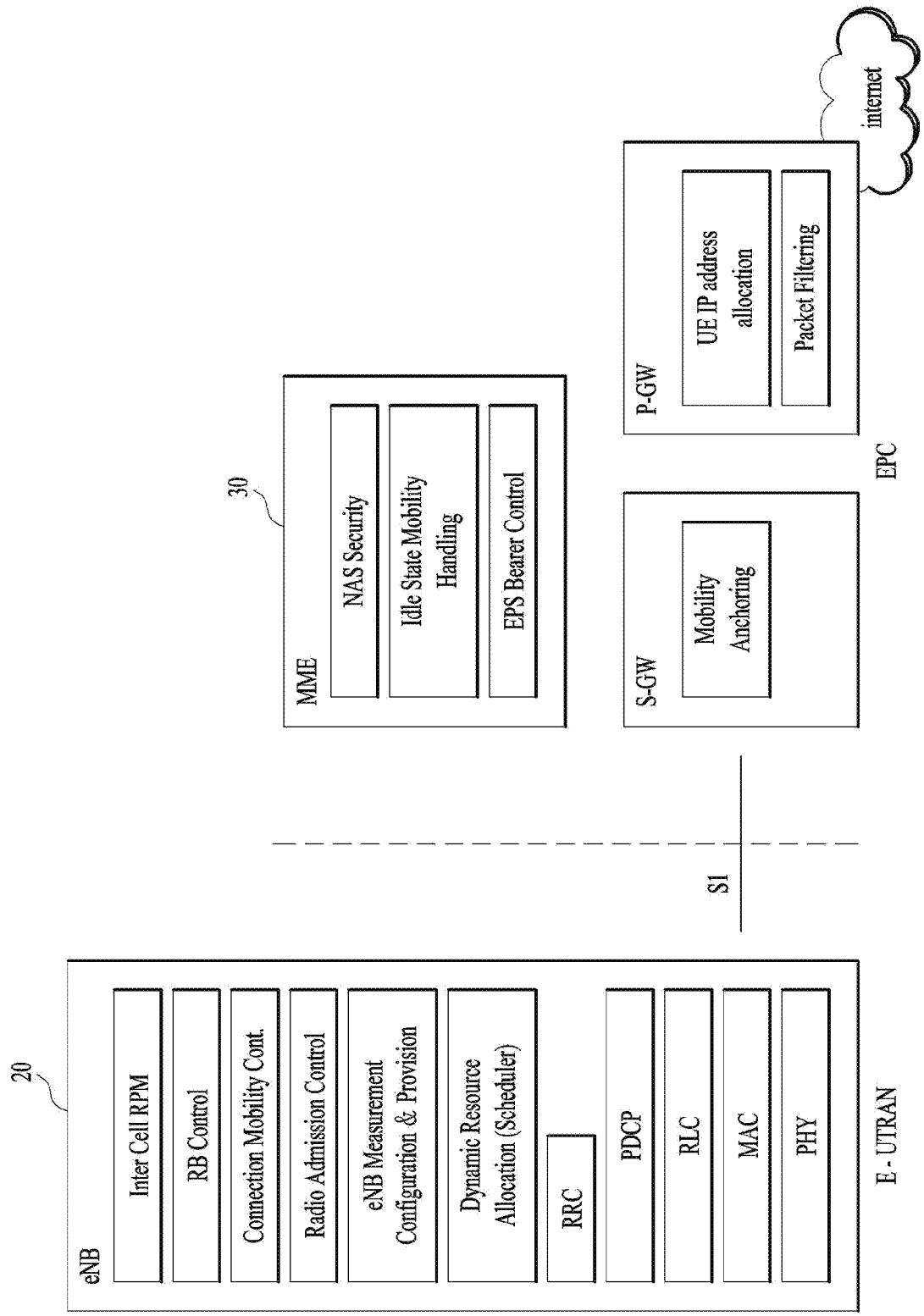

FIG. 3
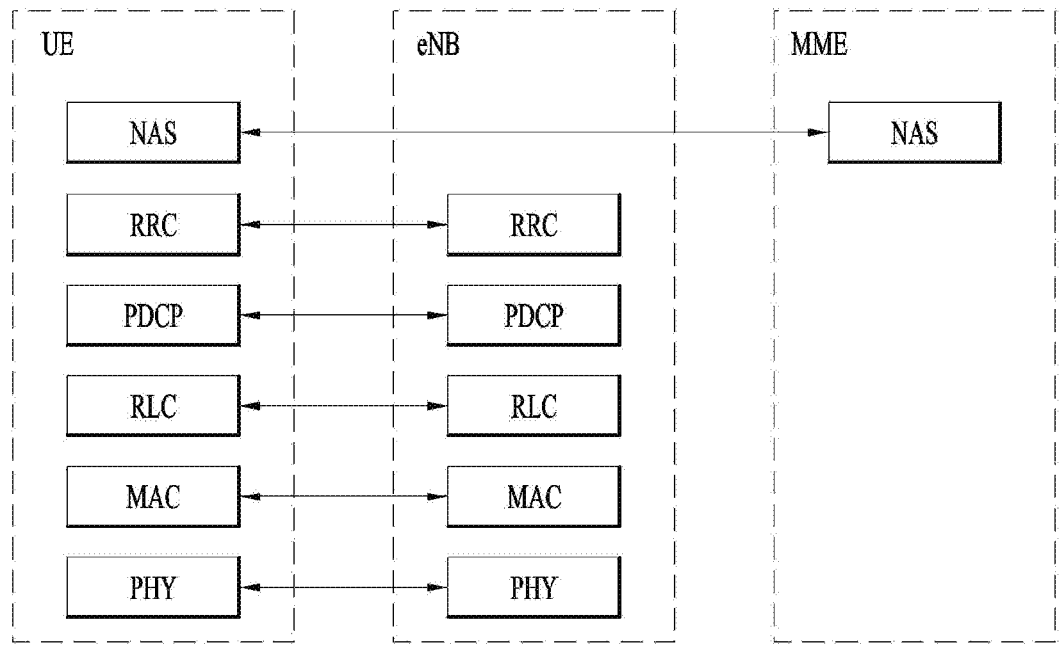
(a) Control-Plane Protocol Stack
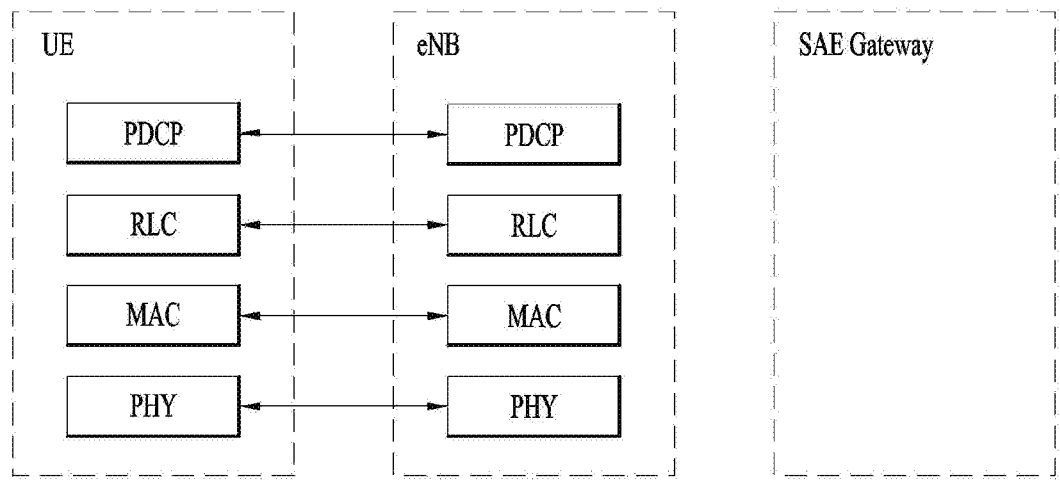
(b) User-Plane Protocol Stack

METHOD FOR TRANSMITTING UPLINK DATA IN A WIRELESS COMMUNICATION SYSTEM AND DEVICE THEREFOR

CROSS-REFERENCE TO RELATED APPLICATIONS

This application is a continuation of U.S. patent application Ser. No. 16/086,583, filed on Sep. 19, 2018, which is the National Stage filing under 35 U.S.C. 371 of International Application No. PCT/KR2017/003106, filed on Mar. 23, 2017, which claims the benefit of U.S. Provisional Application No. 62/312,440, filed on Mar. 23, 2016, the contents of which are all hereby incorporated by reference herein in their entirety.

TECHNICAL FIELD

The present invention relates to a wireless communication system and, more particularly, to a method for transmitting uplink data.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

Based on the above-mentioned discussion, methods for transmitting uplink data in a wireless communication system and apparatuses therefor shall be proposed in the following description.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method for a user equipment (UE) operating in a wireless communication system, the method comprising: receiving information including contention based channel configuration and traffic characteristic associated with the contention based channel configuration; configuring a contention based channel resource according to the contention based channel configuration; checking whether uplink (UL) data is suitable for the traffic characteristic associated with the contention based channel configuration; and transmitting the UL data using the contention based channel resource if the UL data is suitable for the traffic characteristic associated with the contention based channel configuration.

In accordance with another aspect of the present invention, A User Equipment (UE) for operating in a wireless communication system, the UE comprising: a Radio Frequency (RF) module; and a processor operably coupled with the RF module and configured to: receive information including contention based channel configuration and traffic characteristic associated with the contention based channel configuration, configure a contention based channel resource according to the contention based channel configuration, check whether uplink (UL) data is suitable for the traffic characteristic associated with the contention based channel configuration, and transmit the UL data using the contention based channel resource if the UL data is suitable for the traffic characteristic associated with the contention based channel configuration.

Preferably, the contention based channel resource is a time-frequency resource on which multiple UEs can transmit UL packet, simultaneously.

Preferably, the UL data is transmitted with an identifier of the UE on the contention based channel resource.

Preferably, the information is received via a dedicated signaling or system information.

Preferably, the traffic characteristic includes at least one: a traffic type that can be transmitted by the contention based channel resource, a maximum packet size that can be transmitted by the contention based channel resource, a maximum delay that can be transmitted by the contention based channel resource; a maximum error ratio that can be transmitted by the contention based channel resource; or a Quality of service Class Indicator (QCI) of traffic that can be transmitted by the contention based channel resource.

Preferably, the information further includes an indication indicating at least one radio resource control (RRC) state that can use the contention based channel resource.

Preferably, the information further includes an indication indicating at least one radio resource control (RRC) state that can use the contention based channel resource.

Preferably, the contention based channel configuration includes at least one: one or more radio resources of the contention based channel resource; subframe information of the contention based channel resource; Layer 2 configuration of the contention based channel resource; or security information used for the contention based channel resource.

Preferably, if the UL data is not suitable for the traffic characteristic associated with the contention based channel configuration, the UE doesn't use the contention based channel resource to transmit the UL data.

Preferably, the UE transmits the UL data using a UL grant received due to scheduling request (SR) and buffer status report (BSR) if the UE is connected and has a dedicated SR resource.

Preferably, the UE transmits the UL data using a UL grant received due to random-access channel (RACH) and buffer status report (BSR) if the UE is connected but doesn't have a dedicated scheduling request (SR) resource, or the UE is in an idle state.

Preferably, if the information includes a multiple contention based channel configurations, a multiple contention based channel resources are configured according to the multiple contention based channel configurations, respectively.

It is to be understood that both the foregoing general description and the following detailed description of the present invention are exemplary and explanatory and are intended to provide further explanation of the invention as claimed.

Advantageous Effects

According to the present invention, the UE can reduce the data transmission latency by using a contention based channel resource.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

MODE FOR INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
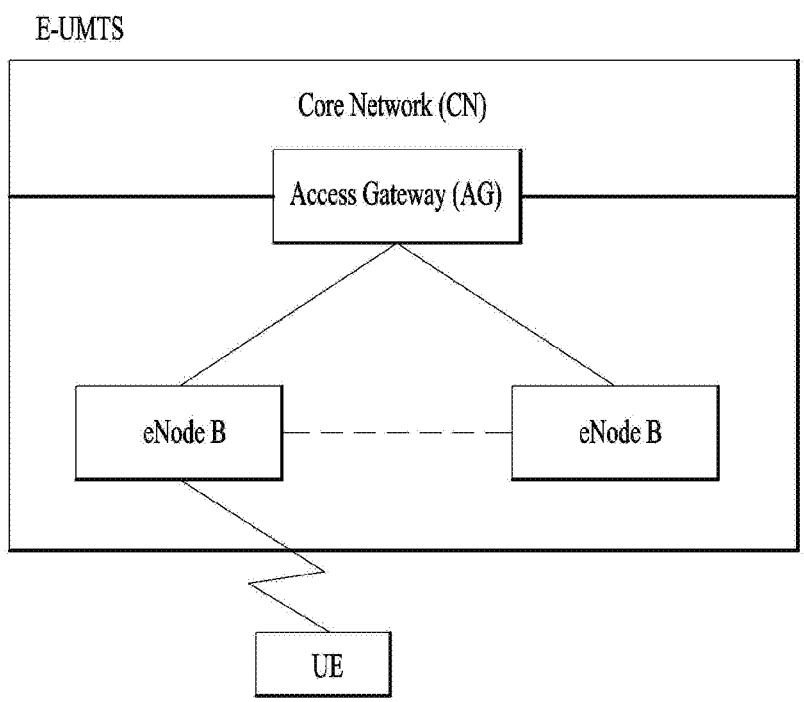
FIG. 1 is a diagram showing a network structure of an Evolved Universal Mobile Telecommunications System (E-UMTS) as an example of a wireless communication system.
Figure 2A:
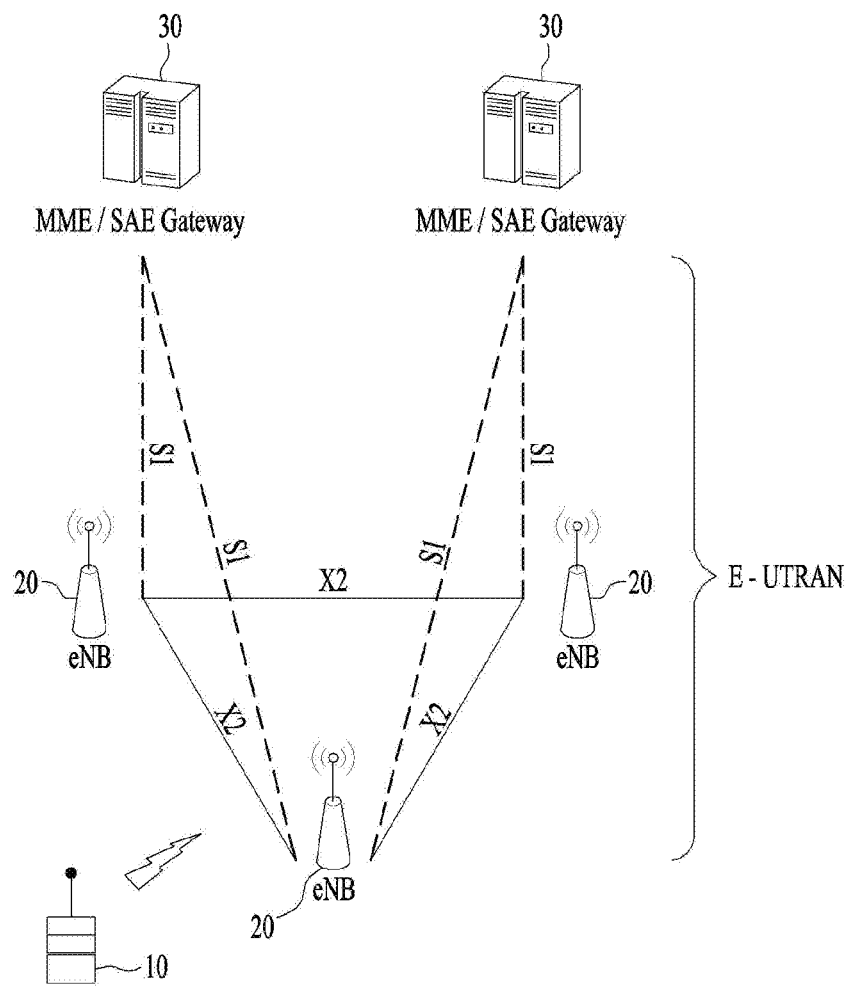
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an Si interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
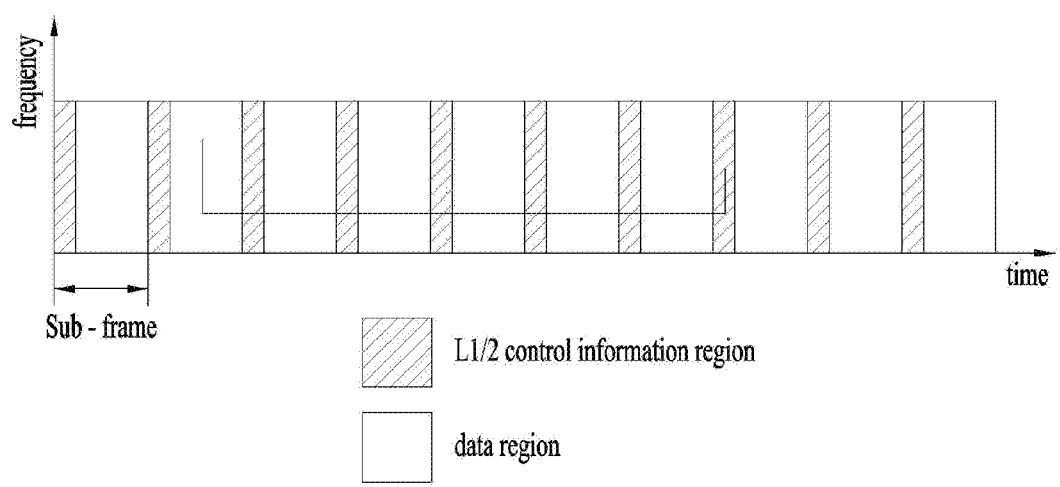
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
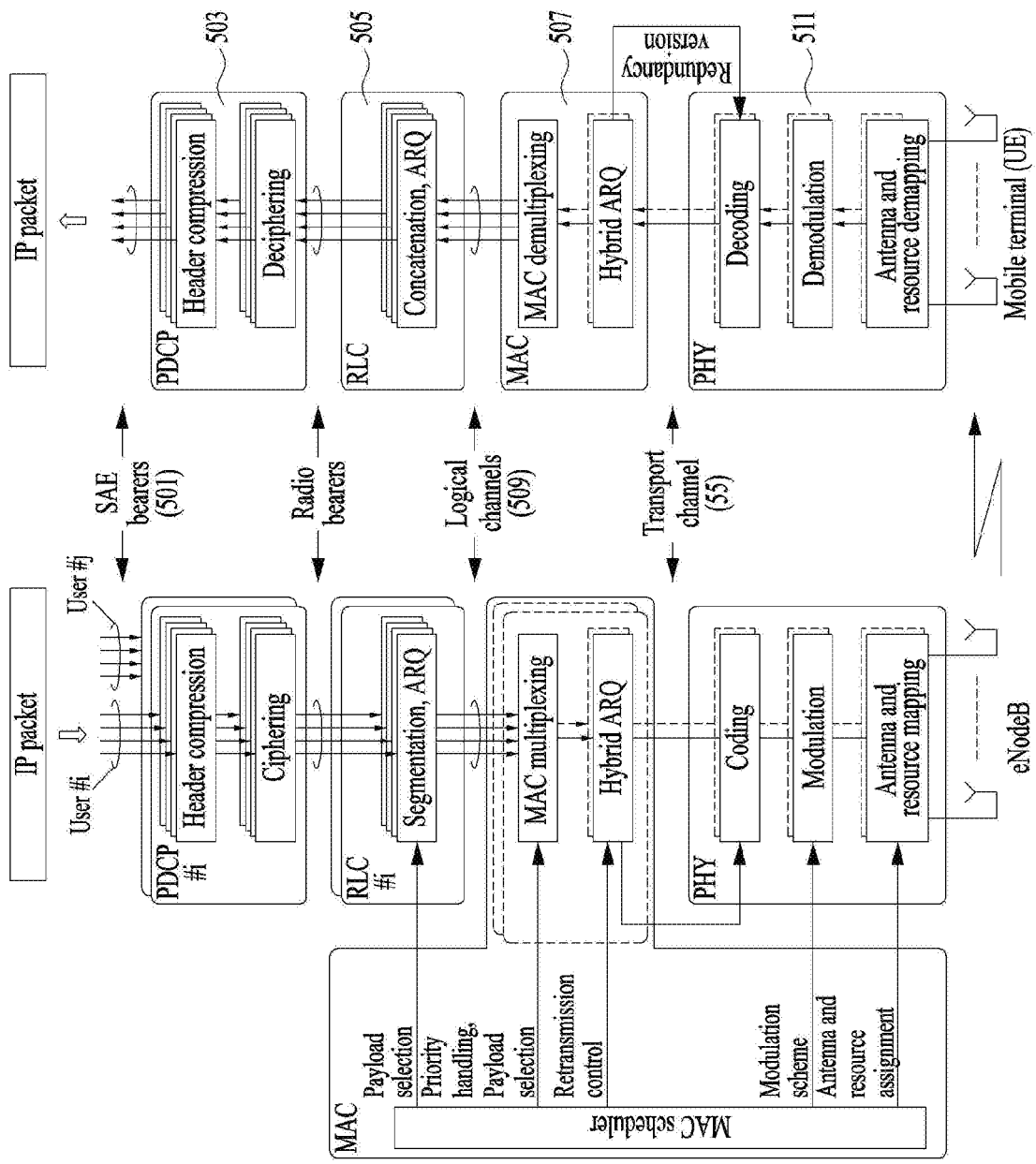
FIG. 5 is a diagram for a general overview of the LTE protocol architecture for the downlink.

FIG. 5 is a diagram for a general overview of the LTE protocol architecture for the downlink.

A general overview of the LTE protocol architecture for the downlink is illustrated in FIG. 5. Furthermore, the LTE protocol structure related to uplink transmissions is similar to the downlink structure in FIG. 5, although there are differences with respect to transport format selection and multi-antenna transmission.

Data to be transmitted in the downlink enters in the form of IP packets on one of the SAE bearers (501). Prior to transmission over the radio interface, incoming IP packets are passed through multiple protocol entities, summarized below and described in more detail in the following sections:

Packet Data Convergence Protocol (PDCP, 503) performs IP header compression to reduce the number of bits necessary to transmit over the radio interface. The header-compression mechanism is based on ROHC, a standardized header-compression algorithm used in WCDMA as well as several other mobile-communication standards. PDCP (503) is also responsible for ciphering and integrity protection of the transmitted data. At the receiver side, the PDCP protocol performs the corresponding deciphering and decompression operations. There is one PDCP entity per radio bearer configured for a mobile terminal.

Radio Link Control (RLC, 505) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (505) offers services to the PDCP (503) in the form of radio bearers. There is one RLC entity per radio bearer configured for a terminal.

There is one RLC entity per logical channel configured for a terminal, where each RLC entity is responsible for: i) segmentation, concatenation, and reassembly of RLC SDUs; ii) RLC retransmission; and iii) in-sequence delivery and duplicate detection for the corresponding logical channel.

Other noteworthy features of the RLC are: (1) the handling of varying PDU sizes; and (2) the possibility for close interaction between the hybrid-ARQ and RLC protocols. Finally, the fact that there is one RLC entity per logical channel and one hybrid-ARQ entity per component carrier implies that one RLC entity may interact with multiple hybrid-ARQ entities in the case of carrier aggregation.

The purpose of the segmentation and concatenation mechanism is to generate RLC PDUs of appropriate size from the incoming RLC SDUs. One possibility would be to define a fixed PDU size, a size that would result in a compromise. If the size were too large, it would not be possible to support the lowest data rates. Also, excessive padding would be required in some scenarios. A single small PDU size, however, would result in a high overhead from the header included with each PDU. To avoid these drawbacks, which is especially important given the very large dynamic range of data rates supported by LTE, the RLC PDU size varies dynamically.

In process of segmentation and concatenation of RLC SDUs into RLC PDUs, a header includes, among other fields, a sequence number, which is used by the reordering and retransmission mechanisms. The reassembly function at the receiver side performs the reverse operation to reassemble the SDUs from the received PDUs.

Medium Access Control (MAC, 507) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (507) offers services to the RLC (505) in the form of logical channels (509).

Physical Layer (PHY, 511), handles coding/decoding, modulation/demodulation, multi-antenna mapping, and other typical physical layer functions. The physical layer (511) offers services to the MAC layer (507) in the form of transport channels (513).

Figure 6:
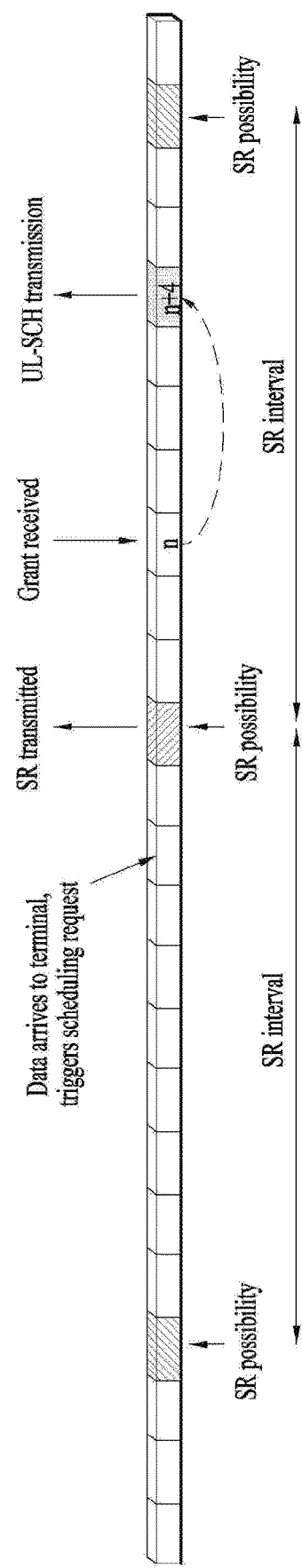
FIG. 6 is a diagram for Scheduling-request transmission.

FIG. 6 is a diagram for Scheduling-request transmission.

The scheduler needs knowledge about the amount of data awaiting transmission from the terminals to assign the proper amount of uplink resources. Obviously, there is no need to provide uplink resources to a terminal with no data to transmit as this would only result in the terminal performing padding to fill up the granted resources. Hence, as a minimum, the scheduler needs to know whether the terminal has data to transmit and should be given a grant. This is known as a scheduling request.

A scheduling request is a simple flag, raised by the terminal to request uplink resources from the uplink scheduler. Since the terminal requesting resources by definition has no PUSCH resource, the scheduling request is transmitted on the PUCCH. Each terminal can be assigned a dedicated PUCCH scheduling request resource, occurring every nth subframe. With a dedicated scheduling-request mechanism, there is no need to provide the identity of the terminal requesting to be scheduled as the identity of the terminal is implicitly known from the resources upon which the request is transmitted.

When data with higher priority than already existing in the transmit buffers arrives at the terminal and the terminal has no grant and hence cannot transmit the data, the terminal transmits a scheduling request at the next possible instant, as illustrated in FIG. 15. Upon reception of the request, the scheduler can assign a grant to the terminal. If the terminal does not receive a scheduling grant until the next possible scheduling-request instant, then the scheduling request is repeated. There is only a single scheduling-request bit, irrespective of the number of uplink component carriers the terminal is capable of. In the case of carrier aggregation, the scheduling request is transmitted on the primary component carrier, in line with the general principle of PUCCH transmission on the primary component carrier only.

The use of a single bit for the scheduling request is motivated by the desire to keep the uplink overhead small, as a multi-bit scheduling request would come at a higher cost. A consequence of the single-bit scheduling request is the limited knowledge at the eNodeB about the buffer situation at the terminal when receiving such a request. Different scheduler implementations handle this differently. One possibility is to assign a small amount of resources to ensure that the terminal can exploit them efficiently without becoming power limited. Once the terminal has started to transmit on the UL-SCH, more detailed information about the buffer status and power headroom can be provided through the inband MAC control message, as discussed below. Knowledge of the service type may also be used—for example, in the case of voice the uplink resource to grant is preferably the size of a typical voice-over-IP package. The scheduler may also exploit, for example, path-loss measurements used for mobility and handover decisions to estimate the amount of resources the terminal may efficiently utilize.

An alternative to a dedicated scheduling-request mechanism would be a contention-based design. In such a design, multiple terminals share a common resource and provide their identity as part of the request. This is similar to the design of the random access.

The number of bits transmitted from a terminal as part of a request would in this case be larger, with the correspondingly larger need for resources. In contrast, the resources are shared by multiple users. Basically, contention-based designs are suitable for a situation where there are a large number of terminals in the cell and the traffic intensity, and hence the scheduling intensity, is low. In situations with higher intensities, the collision rate between different terminals simultaneously requesting resources would be too high and lead to an inefficient design.

Although the scheduling-request design for LTE relies on dedicated resources, a terminal that has not been allocated such resources obviously cannot transmit a scheduling request. Instead, terminals without scheduling-request resources configured rely on the random-access mechanism. In principle, an LTE terminal can therefore be configured to rely on a contention-based mechanism if this is advantageous in a specific deployment.

The Scheduling Request (SR) is used for requesting UL-SCH resources for new transmission. When an SR is triggered, it shall be considered as pending until it is cancelled. All pending SR(s) shall be cancelled and sr-ProhibitTimer shall be stopped when a MAC PDU is assembled and this PDU includes a BSR which contains buffer status up to (and including) the last event that triggered a BSR, or when the UL grant(s) can accommodate all pending data available for transmission.

If an SR is triggered and there is no other SR pending, the UE may set the SR_COUNTER to 0.

As long as one SR is pending, if no UL-SCH resources are available for a transmission in this TTI, the UE may initiate a Random Access procedure on a PCell and cancel all pending SRs if the UE has no valid PUCCH resource for SR configured in any TTI.

Else if the UE has a valid PUCCH resource for SR configured for this TTI and if this TTI is not part of a measurement gap and if sr-ProhibitTimer is not running, if SR_COUNTER<dsr-TransMax, the UE may increment SR_COUNTER by 1, instruct the physical layer to signal the SR on PUCCH, and start the sr-ProhibitTimer.

If SR_COUNTER≥dsr-TransMax, the UE may notify RRC to release PUCCH/SRS for all serving cells, clear any configured downlink assignments and uplink grants, and initiate a Random Access procedure on the PCell and cancel all pending SRs.

Figure 7:
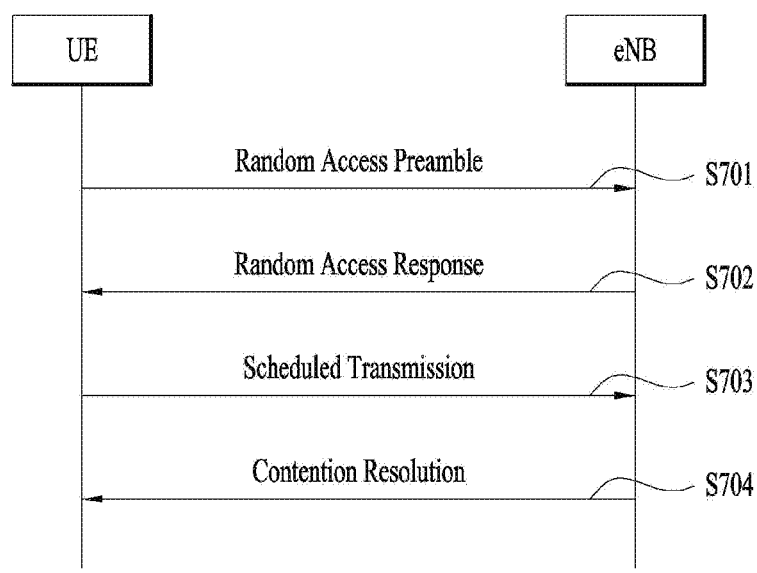
FIG. 7 is a diagram for describing a random access procedure.

FIG. 7 is a diagram for describing a random access procedure.

(1) 1$^{st}$ Message Transmission

First of all, a user equipment randomly selects a random access preamble from a set of random access preambles indicated by system information or a handover command, selects a PRACH (physical RACH) resource for carrying the random access preamble, and then transmits the random access preamble via the selected PRACH resource [S701].

(2) 2$^{nd}$ Message Reception

After the user equipment has transmitted the random access preamble in the step S701, the user equipment attempts a reception of its random access response in a random access response receiving window indicated by an eNode B through the system information or the handover command [S702]. In particular, the random access response information may be transmitted in format of MAC PDU. And, the MAC PDU may be carried on PDSCH (physical downlink shared channel). In order to receive the information carried on the PDSCH, the user equipment preferably monitors PDCCH (physical downlink control channel). In particular, information on a user equipment necessary to receive the PDSCH, a frequency and time information of a radio resource of the PDSCH, a transmission format of the PDSCH and the like may be preferably included in the PDCCH. Once the user equipment succeeds in the reception of the PDCCH transmitted to the user equipment, it may be able to appropriately receive a random access response carried on the PDSCH in accordance with the informations of the PDCCH. And, a random access preamble identifier (ID) (e.g., RAPID (random access preamble identifier), a UL grant indicating a UL radio resource, a temporary cell identifier (temporary C-RNTI), time synchronization correction value (timing advance command (TAC)) and the like can be included in the random access response.

As mentioned in the foregoing description, the random access preamble identifier is required for the random access response. Since random access response information for at least one or more user equipments may be included in one random access preamble, it may be necessary to indicate the UL grant, the temporary cell identifier and the TAC are valid for which user equipment. In this step, assume that the user equipment selects a random access preamble identifier matching the random access preamble selected by the user equipment in the step S702. Through this, the user equipment may be able to receive a UL grant, a temporary cell identifier 9temporary C-RNTI), time synchronization correction value (timing advance command: TAC) and the like.

(3) 3$^{rd}$ Message Transmission

If the user equipment receives the random access response valid for the user equipment, it may process the informations included in the random access response. In particular, the user equipment applies the TAC and saves the temporary cell identifier. Moreover, the user equipment may be able to save data, which is to be transmitted in response to the valid random access response, in a message-3 buffer.

Meanwhile, using the received UL grant, the user equipment transmits data (i.e., a 3rd message) to the eNode B [S703]. For an example, the data may include the Buffer Status Report. In the contention based random access procedure, an eNode B is unable to determine which user equipments perform the random access procedure. In order for resolve the contention later, the eNode B needs to identify a user equipment.

As a method of including an identifier of a user equipment, two kinds of methods have been discussed. According to a 1st method, if a user equipment has a valid cell identifier already allocated by a corresponding cell prior to the random access procedure, the user equipment transmits its cell identifier via UL transmission signal corresponding to the UL grant. On the contrary, if the user equipment fails to receive the allocation of a valid cell identifier prior to the random access procedure, the user equipment transmits its unique identifier (e.g., S-TMSI, random ID (Random Id), etc.). In general, the unique identifier is longer than the cell identifier. If the user equipment transmits data corresponding to the UL grant, the user equipment initiates a contention resolution timer (hereinafter abbreviated CR timer).

(4) 4$^{th}$ Message Reception

After the user equipment has transmitted the data including its identifier via the UL grant included in the random access response, the user equipment waits for an instruction from the eNode B for the contention resolution. In particular, the user equipment may attempt a reception of PDCCH to receive a specific message [S704]. As a method of receiving the PDCCH, two kinds of methods have been discussed. As mentioned in the foregoing description, if the 3rd message transmitted in response to the UL grant uses a cell identifier as its identifier, the user equipment attempts a reception of PDCCH using its cell identifier. If the identifier is a unique identifier, the user equipment may be able to attempt a reception of PDCCH using a temporary cell identifier included in the random access response. Thereafter, in the former case, if the PDCCH is received via its cell identifier before expiration of the contention resolution timer, the user equipment determines that the random access procedure is normally performed and then ends the random access procedure. In the latter case, if PDCCH is received via a temporary cell identifier before expiration of the contention resolution timer, the user equipment checks data carried on PDSCH indicated by the PDCCH. If the unique identifier of the user equipment is included in a content of the data, the user equipment determines that the random access procedure is normally performed and then ends the random access procedure.

The Buffer Status Reporting (BSR) procedure is used to provide a serving eNB with information about the amount of data available for transmission in the UL buffers of the UE. RRC may control BSR reporting by configuring the two timers periodicBSR-Timer and retxBSR-Timer and by, for each logical channel, optionally signaling Logical Channel Group which allocates the logical channel to an LCG (Logical Channel Group).

For the Buffer Status reporting procedure, the UE may consider all radio bearers which are not suspended and may consider radio bearers which are suspended. A Buffer Status Report (BSR) may be triggered if any of the following events occur:

UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the UE has data available for transmission for any of the logical channels which belong to a LCG, in which case the BSR is referred below to as "Regular BSR";

periodicBSR-Timer expires, in which case the BSR is referred below to as "Periodic BSR".

For Regular and Periodic BSR, if more than one LCG has data available for transmission in the TTI where the BSR is transmitted, the UE may report Long BSR. If else, the UE may report Short BSR.

If the Buffer Status reporting procedure determines that at least one BSR has been triggered and not cancelled, if the UE has UL resources allocated for new transmission for this TTI, the UE may instruct the Multiplexing and Assembly procedure to generate the BSR MAC control element(s), start or restart periodicBSR-Timer except when all the generated BSRs are Truncated BSRs, and start or restart retxBSR-Timer.

Else if a Regular BSR has been triggered, if an uplink grant is not configured or the Regular BSR was not triggered due to data becoming available for transmission for a logical channel for which logical channel SR masking (logicalChannelSR-Mask) is setup by upper layers, a Scheduling Request shall be triggered.

A MAC PDU may contain at most one MAC BSR control element, even when multiple events trigger a BSR by the time a BSR can be transmitted in which case the Regular BSR and the Periodic BSR shall have precedence over the padding BSR.

The UE may restart retxBSR-Timer upon indication of a grant for transmission of new data on any UL-SCH.

All triggered BSRs may be cancelled in case UL grants in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

In summary, the BSR is triggered in any of the following situation:

i) when data arrive for a logical channel which has higher priority than the logical channels whose buffers are not empty;

ii) when data become available for the UE's buffer, which is empty;

iii) when the retxBSR-Timer expires and there is still data in the UE's buffer;

iv) when a periodicBSR-Timer expires; or v) when the remaining space in a MAC PDU can accommodate a BSR.

In LTE, the procedure for the UE to transmit infrequent UL packet to the eNB is as follows.

If the UE is in an RRC connected state and has valid PUCCH resource available for transmitting the Scheduling Request, the UE may transmit the Scheduling Request to the eNB through the PUCCH resource for the Scheduling Request. On the other hand, if the UE is in an RRC Idle state or no valid PUCCH resources are available for the Scheduling Request, the UE may initiate a Random Access procedure.

Thereafter, the UE may transmit the Buffer Status Report to the eNB and receive the UL grant in response to Buffer Status Report from the eNB. After that, the UE may transmit the infrequent UL packets based on the UL grant. In any way, the infrequent UL packet (e.g., UL-SCH data or L2 data) is transmitted only based on UL grant.

However, when performing such a procedure, it takes much time for the UE to transmit infrequent UL packets. In LTE New Radio (NR) technology for 5G, it is important to ensure very short latency for uplink user plane packets, especially for infrequent small packets. Therefore, a mechanism to support short latency for the infrequent small packets is needed.

Figure 8:
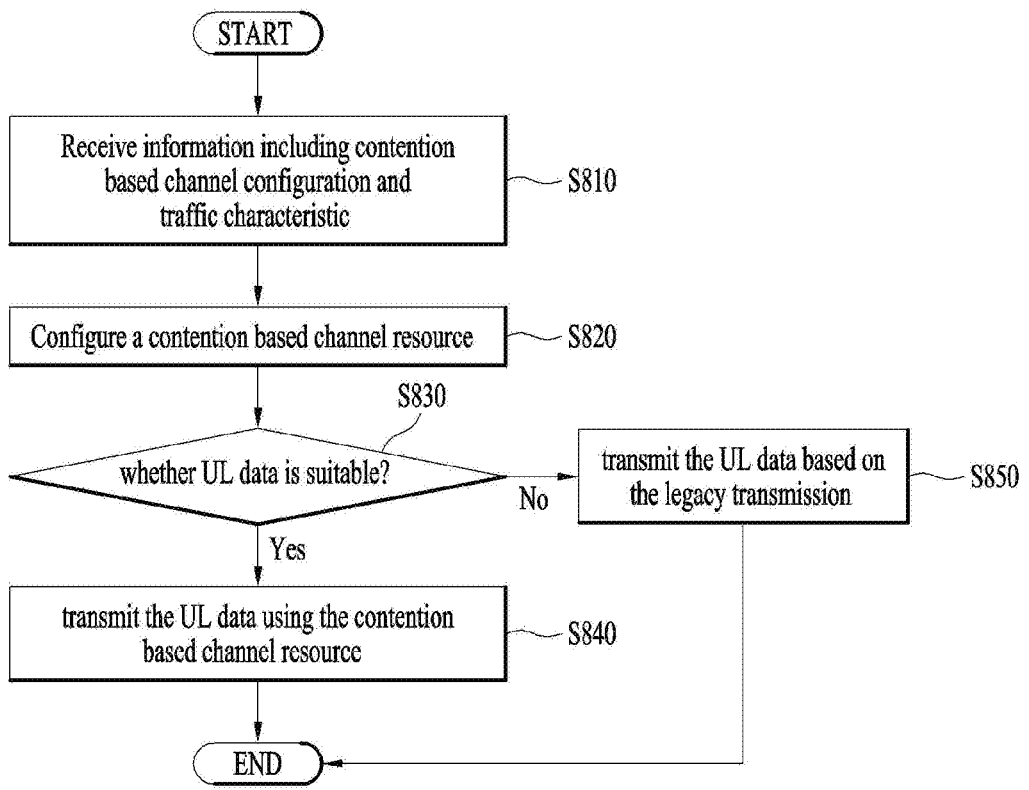
FIG. 8 is a flowchart illustrating data transmission according to an embodiment of the present invention.

FIG. 8 is a flowchart illustrating data transmission according to an embodiment of the present invention.

Referring to FIG. 8, the UE may receive configuration information including contention based channel configuration and traffic characteristic associated with the contention based channel configuration (S810). The traffic characteristic may be defined as a part of the contention based channel configuration. The contention based channel may be replaced with the term Fast UL Channel (FUCH).

As shown above, in the legacy system, the UE performs Scheduling Request transmission or Random Access procedure according to the state (i.e., Idle mode or Connected mode) of the UE. However, the contention based channel can be used by the UEs in both the Idle mode and Connected mode.

The UE can configure multiple contention based channels depending on the characteristics of the traffic served by each contention based channel. The UE also configures PDCP/RLC/MAC for each contention based channel according to the configuration information. For this, the UE may configure one PDCP, one RLC, and one MAC for the one contention based channel. In other word, all traffics may be transmitted by a contention based channel using the same PDCP/RLC/MAC. For an example, UE may not configure PDCP or RLC. Each packet transmitted on contention based channel may be handled independently, i.e. there is no relationship between subsequent packets.

The configuration information including contention based channel configuration is received via a dedicated signaling or common/broadcast signaling. As an example, contention based channel configuration is provided by the eNB using system information. As an example, the contention based channel configuration may include at least one of one or more radio resources of the contention based channel resource, subframe information of the contention based channel resource, Layer 2 configuration of the contention based channel resource; or security information used for the contention based channel resource. At this time, the contention based channel configuration may contain at least one of following information for contention based channel.

Traffic characteristics including at least one of (i) Traffic type that can be transmitted by contention based channel (e.g. Voice, Streaming, Interactive, Background), (ii) a maximum packet size that can be transmitted by the contention based channel resource, (iii) a maximum delay that can be transmitted by the contention based channel resource, (iv) a maximum error ratio that can be transmitted by the contention based channel resource, or (v) QoS Class Indicator (QCI) of the traffic that can be transmitted by contention based channel.

contention based channel radio resource configuration (e.g. time, frequency, subframe)

Layer 2 configuration, e.g. PDCP/RLC/MAC configuration. It is possible that there is no PDCP or RLC defined for contention based channel. In this case, PDCP or RLC configuration is indicated as N/A. MAC configuration for contention based channel can be simplified compared to prior art, i.e. no Logical Channel Prioritization (no multiplexing), no SR/BSR/RACH, no MAC Control Element.

Security information used for contention based channel

UE state that can use this contention based channel. At least one of Idle/Connected/Suspend/Resume state can be indicated. For example, this contention based channel can be used by both Idle and Connected UEs, only Idle UEs, or only Connected UEs.

For another example, the information may contain more than one contention based channel configuration. In addition, the information containing contention based channel configuration may be broadcast periodically, e.g., through system information.

As another example, the eNB may provide the contention based channel configuration to the UE by dedicated signaling. In this case, the UE prioritizes the contention based channel configuration received by dedicated signaling over the contention based channel configuration received by system information.

Subsequently, the UE may configure a contention based channel (e.g., contention based channel resource) according to the contention based channel configuration (S820). For example, the contention based channel resource may be a time-frequency resource on which multiple UEs can transmit UL packet, simultaneously. The contention based channel resource may be periodically configured on a set of subframes, e.g., which is defined by a subframe period and a subframe offset.

After the configuration is set up, if UL data (e.g, UL-SCH data or L2 data) to be transmitted occurs or becomes available, the UE may check whether the uplink data is suitable for the traffic characteristic associated with the contention based channel configuration (S830).

If the UL data is suitable for the traffic characteristic associated with the contention based channel configuration, the UE may transmit the UL data using the contention based channel resource (S840) which does not require UL grant. As an example, multiple UEs can transmit UL packet using a same contention based channel resource in a same subframe. If contention happens, the eNB may not receive some or all of packets transmitted from multiple UEs. The UE includes the identifier of the UE in the packets transmitted on contention based channel. For example, the UL data may be transmitted with an identifier of the UE on the contention based channel resource. If the UE is in RRC connected mode, the identifier of the UE may be C-RNTI, and if the UE is in RRC idle mode, the identifier of the UE may be a unique ID for the UE such as IMSI (International Mobile Subscriber Identity) or GUTI (Globally Unique Temporary Identifier).

As an example, there is no HARQ feedback for contention based channel transmission. Instead, the HARQ feedback may be provided by RLC or NAS. For example, after UL data is transmitted through contention based channel, UE does not perform a procedure for receiving HARQ feedback for contention based channel transmission, but performs a procedure for receiving ARQ feedback, which is provided by RLC or NAS, for contention based channel transmission.

On the other hand, if the UL data is not suitable for the traffic characteristic associated with the contention based channel configuration, the UE doesn't use the contention based channel resource to transmit the UL data. Instead, the UE may transmit the UL data based on the legacy transmission (S850). For an example, if the UE is connected and has a dedicated SR resource, the UE transmits the UL data using a UL grant received due to scheduling request (SR) and buffer status report (BSR). For another example, if the UE is connected but doesn't have a dedicated scheduling request (SR) resource or the UE is in an idle state, the UE transmits the UL data using a UL grant received due to random-access channel (RACH) and buffer status report (BSR). In this case, the UE may perform a procedure for receiving HARQ feedback for UL data transmission. A detailed description thereof is described with reference to FIGS. 6 and 7, and a description of legacy communication is omitted.

Figure 9:
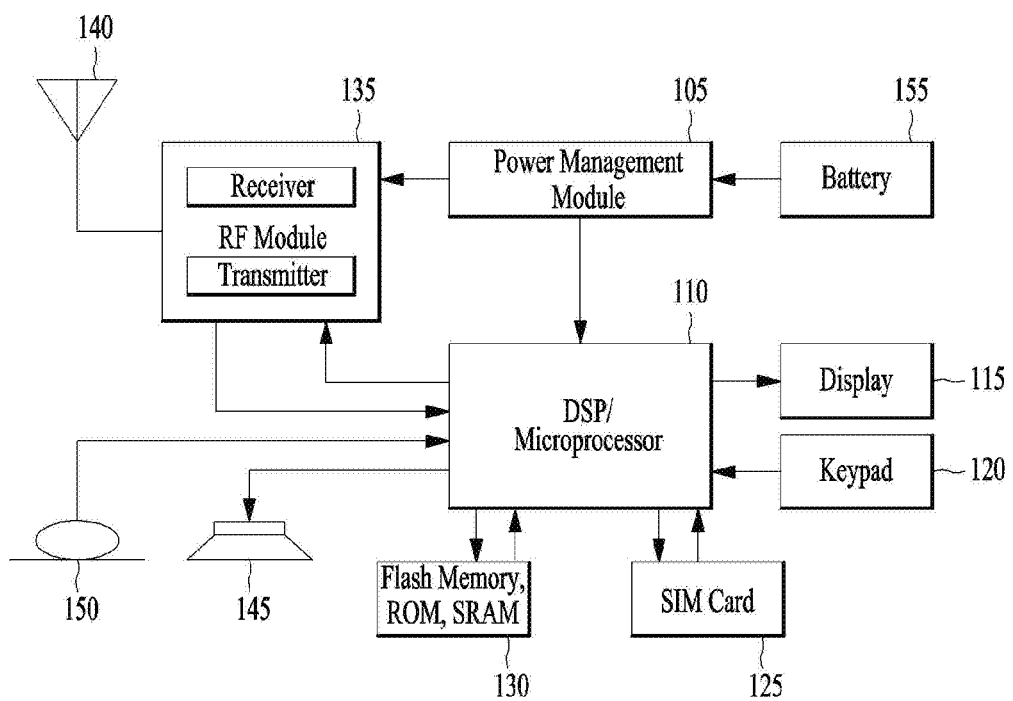
FIG. 9 is a block diagram of a communication apparatus according to an embodiment of the present invention.

FIG. 9 is a block diagram of a communication apparatus according to an embodiment of the present invention.

The apparatus shown in FIG. 9 can be a user equipment (UE) and/or eNB adapted to perform the above mechanism, but it can be any apparatus for performing the same operation.

As shown in FIG. 9, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 9 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 9 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. The processor (110) is configured to perform operations according to the embodiment of the present invention exemplarily described with reference to the accompanying drawings. In particular, the detailed operations of the processor (110) can refer to the contents described with reference to FIGS. 1 to 8.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless communication system, the method comprising:

receiving, from a base station (BS), a configuration for small data transmission, wherein the configuration includes a maximum data size for the small data transmission over a fast uplink channel (FUCH), a Quality of service Class Indicator (QCI) of traffic that can be transmitted by the time-frequency resources for the small data transmission, a traffic type that can be transmitted by the time-frequency resources for the small data transmission, a maximum delay that can be transmitted by the time-frequency resources for the small data transmission; and a maximum error ratio that can be transmitted by the time- frequency resources for the small data transmission;

receiving, from the BS, information related to time-frequency resources for the small data transmission via a radio resource control (RRC) signaling;

based on uplink (UL) data to be transmitted being less than or equal to the maximum data size transmitting the UL data using the time-frequency resources for the small data transmission; and based on the UL data to be transmitted being greater than the maximum data size, performing a random access (RA) procedure for requesting resources to transmit the UL data.

2. The method according to claim 1, wherein the time-frequency resources for the small data transmission are time-frequency resources on which multiple UEs can transmit UL data, simultaneously.

3. The method according to claim 1, wherein the UL data is transmitted with an identifier of the UE on the time-frequency resources for the small data transmission.

4. The method according to claim 1, wherein the configuration is received via a dedicated signaling or system information.

5. A user equipment (UE) in a wireless communication system, the UE comprising:
at least one transceiver;
at least one processor; and
at least one computer memory operably connectable to the at least one processor and storing instructions that, when executed, cause the at least one processor to perform operations comprising:

receiving, from a base station (BS), a configuration for small data transmission, wherein the configuration includes a maximum data size for the small data transmission over a fast uplink channel (FUCH), a Quality of service Class Indicator (QCI) of traffic that can be transmitted by the time-frequency resources for the small data transmission, a traffic type that can be transmitted by the time-frequency resources for the small data transmission, a maximum delay that can be transmitted by the time-frequency resources for the small data transmission; and a maximum error ratio that can be transmitted by the time-frequency resources for the small data transmission;

receiving, from the BS, information related to time-frequency resources for the small data transmission via a radio resource control (RRC) signaling;

based on uplink (UL) data to be transmitted being less than or equal to the maximum data size transmitting the UL data using the time-frequency resources for the small data transmission; and based on the UL data to be transmitted being greater than the maximum data size, performing a random access (RA) procedure for requesting resources to transmit the UL data.

6. The UE according to claim 5, wherein the time-frequency resources for the small data transmission are time-frequency resources on which multiple UEs can transmit UL data, simultaneously.

7. The UE according to claim 5, wherein the UL data is transmitted with an identifier of the UE on the time-frequency resources for the small data transmission.

8. The UE according to claim 5, wherein the configuration is received via a dedicated signaling or system information.

* * * * *